June 15, 1965  H. S. SCHWARTZ  3,189,499
METHOD FOR MAKING POROUS COMPOSITE MATERIALS
Filed May 9, 1961
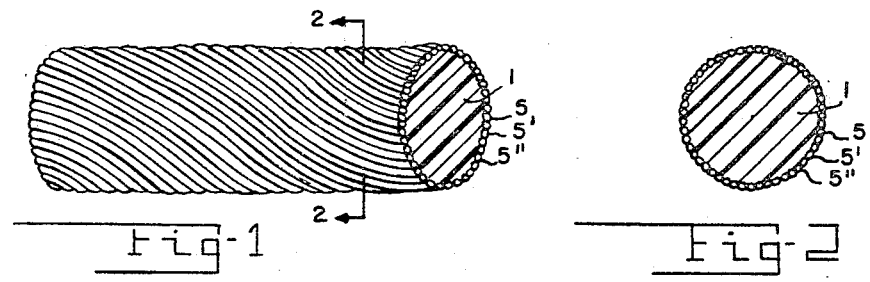
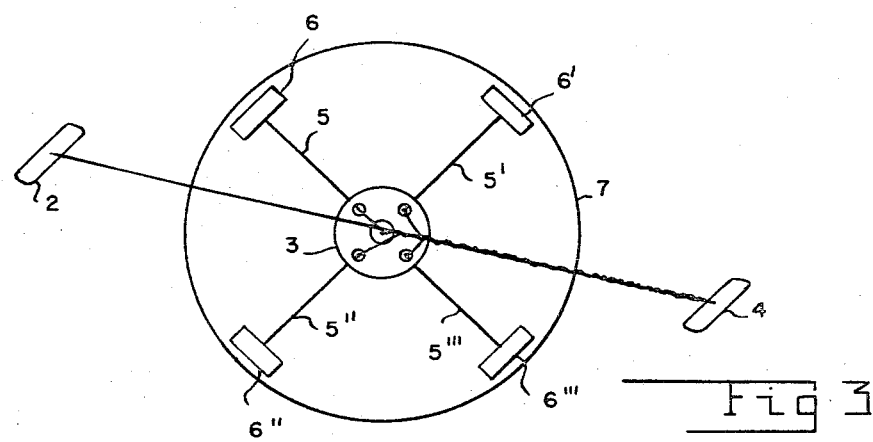
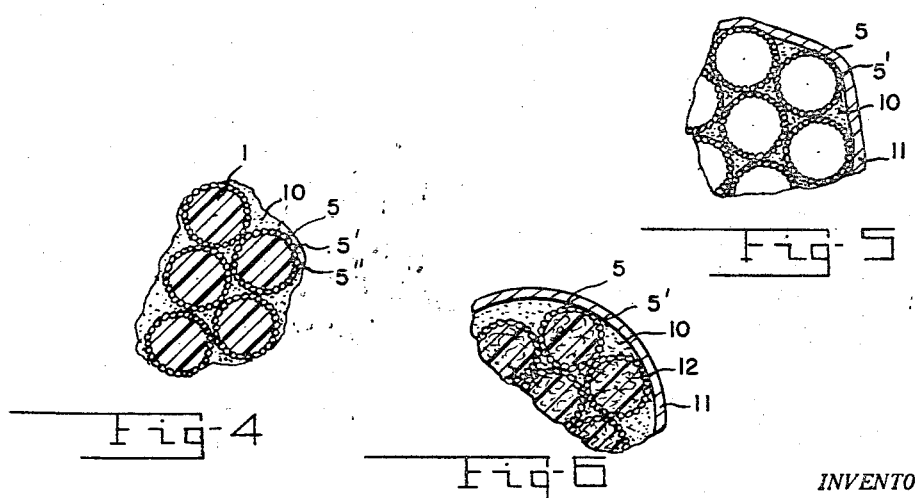
INVENTOR.
HERBERT S. SCHWARTZ
BY
ATTORNEY

United States Patent Office 3,189,499
Patented June 15, 1965

3,189,499
METHOD FOR MAKING POROUS COMPOSITE MATERIALS
Herbert S. Schwartz, Trotwood, Ohio, assignor to the United States of America as represented by the Secretary of the Air Force
Filed May 9, 1961, Ser. No. 108,963
6 Claims. (Cl. 156—155)
(Granted under Title 35, U.S. Code (1952), sec. 266)

The invention described herein may be manufactured and used by or for the United States Government for governmental purposes without the payment to me of any royalty thereon.

This invention relates to an improved method for making porous composite materials that are supreior to competitive materials and to the products so made.

In military applications of rocket motor nozzles, missile nose cones, aircraft leading edges and the like convective heat transfer to exposed surfaces of organic polymeric material decomposes the material with the liberation of gases and the destruction of the exposed surface.

Representative publications in this field are: American Cotton Handbook by G. R. Merrill, A. R. Macormac and H. R. Mauersberger published in 1941 by the American Cotton Handbook Company, 303 Fifth Avenue, New York, New York; Modern Plastics for 1960 published by Breskin Publications, Inc., Bristol, Conn.; Plastics Engineering Handbook, Third edition published in 1960 by Reinhold Publishing Corporation, New York City, New York; Linear and Stereoregular Addition Polymers published in 1959 by Interscience Publishers, Inc., New York City, New York.

The objects of the present invention are to provide a new and useful material that contains pores and open passages that are of controlled dimensions in diameter, length, contour and orientation, which material is adapted for being formed into desired objects such as improved rocket motor nozzles, missile nose cones, aircraft leading edges and the like.

In the accompanying drawings:

FIG. 1 is a fragmentary perspective view of a core on which refractory filaments are being wound to make a yarn, as an early step in the process of the present invention;

FIG. 2 is a sectional view taken along the line 2—2 of FIG. 1;

FIG. 3 is a schematic sketch of apparatus suitable for practicing the method of producing the yarn in FIG. 1 with a plurality of refractory fibers wound spirally on a core filament;

FIG. 4 is a sectional view of combined yarns such as that in FIG. 1, impregnated with a cement as a further step in the process disclosed herein;

FIG. 5 is a sectional view of a product with the core dissolved away from the material in FIG. 4 and a protective coat bonded to the surface of the material; and FIG. 6 is a sectional view of the product in FIG. 5 impregnated with a voluminous gas producing compound.

The practice of the method for making porous composite materials that is contemplated hereby begins with a resin or plastic monofilament core 1 of uniform diameter. The core 1 is of a material that is selected from the group of thermoplastics that are either readily soluble in non-aqueous or aqueous solvents or that thermally degrade to gaseous products. Examples are acrylates and methacrylates, vinyl polymers such as polyvinylidene chloride, polyvinyl chloride, polyvinyl acetate, and polyvinyl alcohol, polyethylene, polytetrafluoroethylene and polyamide. Of this group, polyvinyl alcohol is soluble in water. The acrylates, methylates and polyvinyl acetate are soluble in acetone. The remaining polymers listed are pyrolyzable in air to form gases. The Plasticizer's Chart, page 560 et seq. of the Breskin publication provides illustrative names, structural formulae, empirical formulae, physical and chemical properties and the like of compounds referred to herein.

Examples of acrylates are esters of acrylic or propenoic acid of the composition $CH_2$:CH COOH, such as benzyl acrylate, methyl acrylate, ethyl acrylate and the like, described in the Breskin publication and elsewhere.

Examples of methacrylates are esters of methacrylic acid of the composition $CH_2C(CH_3)$·COOH, such as methyl methacrylate, ethyl methacrylate, propyl methacrylate and the like; see Breskin.

Vinyl chloride is of the composition $CH_2$:CHCl. Ethylene is of the composition $CH_2$:$CH_2$. The amino radical is $H_2N$—.

The core 1 is made into a composite yarn by the passage of the core 1 from a supply spool 2 through the center of a spindle 3 to a yarn receiving spool 4, as a desired plurality of refractory filaments 5, 5′, 5″ etc. are passed through apertures outwardly of the center of the spindle 3 from refractory filament supply spools 6, 6′, 6″ etc. that are mounted for rotation with the spindle 3 on a carrier wheel 7. The filaments 5, 5′ etc. preferably extend substantially longitudinally of the core 1 and are at an angle of greater than 90° with the axis of the core. The Patent 2,723,705, issued to Howard W. Collins on November 15, 1955 for Method and Apparatus For Making Reinforced Plastic Laminates is illustrative of the spiral winding of warp ribbons on an axially directed mandrel protectively coated with cellophane.

The yarn so made and stored on the yarn spool 4 then consists of the core 1 on the outside surface of which is spirally wound a desired plurality of refractory filaments 5, 5′, 5″ etc.

The composition of the refractory filaments 5, 5′, 5″ etc. is selected from the group of materials that consists of silica, glass, ceramic, carbon, graphite and the like.

In the presence of excessive slippage between the core 1 and the refractory filaments 5, 5′ etc. the core 1 that leaves the storage spool 2 has a cement applied thereto by means of contacting it with a rotatable cement soaked felt cylindrical pad, passing it through a bath or the like before it arrives at the spindle 3. The slippage preventing cement applied to the core 1 is selected from the group of alkyl cellulose compounds, such as methyl or ethyl cellulose and the like. Cellulose has the composition $(C_6H_{10}O_5)_x$ and the methyl and ethyl esters are derivatives that contain corresponding groups, such as 2, 3 and 6OH groups replaced by $CH_3$ groups or $C_2H_5$ groups.

The yarn so made is then impregnated with a low temperature setting inorganic filling cement 10 selected from the group of aluminum phosphate; magnesium oxysulphate of the composition $MgO·MgSO_4$ plus up to about 5 weight percent citric acid; calcium aluminate; silica sols; a ceramic slip; and the like. In order to minimize chemical attack by the cement on the refractory filaments, the filaments are precoated with a thin metal film of aluminum, tin, a lead-tin alloy, or the like, applied on the bare filament surface prior to coating with either the slippage preventing cement and before the filling cement 10 is applied to the yarn.

The cement 10, such as aluminum phosphate of the composition 40 to 60 parts by weight aluminum oxide and 60 to 40 parts by weight of a slurry of aluminum phosphate in water, is added to the yarn by dipping or spraying the yarn with the cement at room temperature. Vacuum impregnation techniques may be used advantageously to promote thorough impregnation. Aluminum phosphate is commonly the orthophosphate that has the composition $AlPO_4$. Aluminum oxide is commonly $Al_2O_3 \cdot XH_2O$, with frequently 3 molecules of water of crystallization.

The cement calcium aluminate is applied to the yarn by soaking the yarn to saturation in a concentrated bath of calcium aluminate $CaAl_2O_4$ dissolved in hydrochloric acid, or of tricalcium aluminate $Ca_3Al_2O_6$ dissolved in an acid selected from the group of HCl, $HNO_3$, $H_2SO_4$ etc. at 20° C. and 1 atmosphere of pressure. The thoroughly saturated yarn is then removed from the cement and is dried with the cement 10 preferably substantially completely filling the interstices between the yarn structures.

The cement impregnated yarns are then positioned together and preferably are parallel to one another. Enough pressure and heat are applied to the resulting body to produce an object made of the resultant firm and uniform material that is free from moisture and solvents and that retains its shape. An illustrative applied pressure is of about 1000 p.s.i. at a temperature of about 550° F.

The resultant composite, cemented, fibrous material is then fully immersed in a solvent that dissolves the core filament. The material is soaked until the core 1 is substantially completely dissolved away. In an illustrative example with the core 1 made of methyl methacrylate resins acetone is a suitable solvent. Acetone has the composition $CH_3COCH_3$. Methyl methacrylate has the composition $CH_2:C(CH_3)COOCH_3$. The Breskin reference describes the acrylics at page 71 and elsewhere. The solvent is chosen to selectively dissolve away the core 1 without dissolving either the refractory filaments 5, 5', 5'' etc. or the cement 10.

The making of the material is continued until substantially all of the core 1 is dissolved away leaving pores of the dimensions and configurations of the cores 1 in the material.

Solvents used may be selected from the group that consists of acetone, benzene, carbon tetrachloride, diethylether, or in general the lower hydrocarbons, esters, ketones etc. suitable for the composition that is to be dissolved without dissolving the refractory filaments or the cement. Benzene has the composition $C_6H_6$. Carbon tetrachloride has the composition $CCl_4$. Diethylether has the composition $(C_2H_5)_2O$.

Pyrolyzing the core composition may be employed for its dissolution if preferred.

The resultant body is porous with predetermined pore dimensions and configurations and is molded to a desired contour for a rocket motor nozzle, missile nose cone, aircraft leading edge or the like.

The porous body is then placed within an oven and is heated to a cement curing temperature, such as not to exceed 550° F. for a desired curing time that increases with the mass of the body cured, such as from 30 to 60 minutes or the like. The curing temperature is maintained below the softening temperature of the refractory fibers 5 and of the cement 10, to avoid deformation and changes in the dimensions of the pores and passages that result from the dissolving out of the cores 1. Shrinkage in pore diameter may be compensated for by starting the process with cores 1 of larger diameter. The cured body is then cooled to room temperature.

The resulting porous material may then be modified, if desired for a particular service.

The impregnation of the resultant porous material with a voluminous gas producing compound is accomplished by soaking the material in a suitable thermoplastic or thermosetting resin or in an inorganic material, with relatively high endothermic heat of decomposition. The resin may be selected from the group of polyvinyl chloride, vinylidene chloride, tetrafluoroethylene fluorocarbons, polyolefins, polyamides, triazine ring polymers, and the like. Vinyl chloride has the composition $CH_2:CHCl$. Vinylidene chloride has the composition $H_2C:C:Cl_2$. Tetrafluoroethylene has the composition $F_2C:CF_2$. Breskin discusses the fluorocarbons and the ethylene polymers at page 94 to page 106 and elsewhere. Olefins are open chain hydrocarbons that have one or more double bonds. Amides are $NH_2$-groups attached to an organic acid radical. Triazine ring polymers are of a composition that contains the group $(C_6H_5N \cdot CH_2)_3$. Amino resins are described by Breskin at page 75 and elsewhere, such as the polyamide resins and the like. Representative inorganic impregnants may be selected from the group of lithium hydride, ammonium chloride, and the like. Lithium hydride has the composition LiH. Ammonium chloride has the composition $NH_4Cl$.

The resins may be caused to impregnate the porous material at elevated temperatures by immersing or vacuum impregnating the porous material in the thermoplastic material in its liquid state or in catalyzed liquid state for thermoset material such as by using epoxy resin with an amine catalyst, followed by curing the material in an autoclave. Epoxy resins are characterized by the presence as the principal reactive group of two carbons attached by a single bond and shunted by an oxygen atom, as on page 220 of the cited Breskin publication for 1961. Breskin for 1960 discusses the epoxy resins at page 89 and elsewhere. The object that is desirable is the liberation during decomposition of relatively large volumes of gases per unit weight of impregnant.

The use of solution types of resins, varnishes etc. are characterized by the disadvantage that voids remain following the evaporation of the solvents.

The impregnation process is expedited by the application of pressure from a hydraulic ram or the like on the high pressure side of the impregnating surface and a vacuum in the low pressure side of the material that is remote from the high pressure side.

Inorganic impregnants may be applied as a fine powder in an organic resin as the dispersed solid phase, in solution or in an emulsion. The impregnated composite is then subjected to a temperature-time cure cycle that is applicable to the impregnant involved.

The core 1 may be of metal wire if preferred, that can be leached away using HCl, $H_2SO_4$, $HNO_3$, $HC_2H_3O_2$, a caustic such as KOH, NaOH etc. or the like within the scope of this invention, except where the acid or caustic will cause the degradation of the heat resistant filament 5 or of the cement 10.

For objects having thin-walled sections the yarns may be grouped to be all parallel with each other and perpendicular to the material surfaces. A short pore length has the property of reducing the quantity of impregnant that is stored in the pore.

The above disadvantages may be reduced by twisting the composite yarn into a spiral or a helix and thereby increasing the pore length, which increases the cooling efficiency of the impregnant. The spirally wound yarn is then fabricated into the composite material.

The composite yarn may be woven into fabrics and the fabrics made into materials characterized by high heat absorption before undergoing appreciable deterioration in either function or structure. The fabric warp yarn will supply cooling gases to the surface while the cross or fill yarn continues to maintain the mechanical strength of the fabric. The fabric may be made to selectively locate a particular yarn with a desired characteristic at a preferred position in the fabric.

For applications wherein thermal insulation is of prime importance and endothermic cooling or heat absorption is not required, the material structure may be modified accordingly.

The composite yarns or fabric laminations made with the composite yarns are assembled so that the longitudinal axes of the yarns are parallel to each other and also parallel to the surface that is to absorb heat; then with the core filaments subsequently dissolved out, the resultant pores do not interconnect and greatly reduce the heat transfer through the material.

The heat transfer may be further reduced by imparting metallized surfaces to the refractory filaments 5, 5', 5" etc. before they are wound spirally around the core 1, then when the core is dissolved away the metallic film reduces the internal radiant heat transmission.

The material illustrated in FIG. 5 comprises empty pores that provide a high thermal insulation characteristic to structures made therefrom. The material is shaped to a desired form and sealed by the application of a skin 11 of a plastic, metal or the like, as preferred.

The material illustrated in FIG. 6 comprises the material in FIG. 5 before the skin 11 is applied thereto and after being impregnated with the voluminous gas producing compound 12 previously referred to.

It is to be understood that the process and the product that are disclosed herein are submitted as operable embodiments of the present invention and that comparable modifications therein may be made without departing from the spirit and scope of the invention.

I claim:

1. The method of making a porous composite material that contains pores and open passages of controlled dimensions by spirally winding a refractory filament of glass around a core of metal wire of uniform diameter to make a yarn, impregnating a plurality of yarns so made with a cellulose cement, drying the cement impregnated yarns, applying heat and pressure to form the dried cement impregnated yarns into a formed object, and dissolving the core out of the yarn with the cement remaining in place and the cement impregnated yarn unchanging in dimension during the removal of the core.

2. The method of making the formed porous object defined by the above claim 1 and impregnating the formed material of which the object is made with a gas forming endothermic resin.

3. The method of making a porous composite formed object by spirally winding a refractory filament selected from the group of silica, glass, ceramics, carbon and graphite around a removable filament of uniform diameter to make a yarn, impregnating the yarn with a cement selected from the group of aluminum phosphate magnesium oxysulfate, calcium aluminate and silica sol, drying the cement impregnated yarn, forming the yarn into a useful shape by the application of pressure of about 1000 p.s.i. until cured for a period of time that increases with increases in the mass of the useful shape at a curing temperature not to exceed 550° C., selectively dissolving the yarn core out of the shaped object by prolonging its immersion under an atmosphere of pressure in a solvent of the acetone type to provide pores of a uniform diameter in a porous body, molding the resultant porous body to a desired contour, curing the cement in the molded body by heating it at 550° C. and under one atmosphere of pressure for from one-half hour to one hour, and cooling the object.

4. The method of forming the object defined by the above claim 3 and then impregnating pores in the body under non-softening heat and pressure with a resin type of impregnant under non-deforming temperatures and pressures and cooling the formed object to room temperature.

5. The method of making a porous composite material that comprises the recited steps of moving linearly a substantially cylindrical soluble plastic core, applying a slippage preventing cement to the core, winding spirally on the plastic core a plurality of insoluble refractory filaments in juxtaposed position axially of the core to substantially cover the surface of the plastic core to make a yarn, impregnating a plurality of yarns with cement, positioning said impregnated yarns together in bonding relationship, applying heat and pressure to form the cement impregnated yarns into a formed object, and dissolving out selectively the soluble plastic core.

6. The method of forming the object defined by claim 5 and then filling the interior of the spirally wound refractory filaments with a resin material that produces gas with endothermic heat of decomposition.

References Cited by the Examiner
UNITED STATES PATENTS 2,772,995  12/56  Wilson.
2,993,526  7/61  Young _____ 156—155

EARL M. BERGERT, *Primary Examiner.*
ALEXANDER WYMAN, *Examiner.*